United States Patent [19]

Satomura

[11] Patent Number: 5,436,881
[45] Date of Patent: Jul. 25, 1995

[54] METHOD AND APPARATUS FOR DETECTING PULSE SIGNAL FOR GENERATING CLOCK FROM RECORDING MEDIUM

[75] Inventor: Seiichiro Satomura, Kawasaki, Japan

[73] Assignee: Canon Kabushiki Kaisha, Tokyo, Japan

[21] Appl. No.: 288,887

[22] Filed: Aug. 10, 1994

Related U.S. Application Data

[63] Continuation of Ser. No. 75,342, Jun. 11, 1993, abandoned, which is a continuation of Ser. No. 584,797, Sep. 19, 1990, abandoned.

[30] Foreign Application Priority Data

Sep. 20, 1989 [JP] Japan .................................. 1-242145
Sep. 14, 1990 [JP] Japan .................................. 2-242793

[51] Int. Cl.⁶ .............................................. G11B 5/09
[52] U.S. Cl. ........................................ 369/59; 360/51
[58] Field of Search ........................................... 369/59

[56] References Cited

U.S. PATENT DOCUMENTS 4,580,176  4/1986  Graves et al. ..................... 360/48
4,933,782  6/1990  Simonson et al. ................ 360/51
4,979,192 12/1990  Shimizume et al. .............. 375/111

Primary Examiner—Vincent P. Canney
Attorney, Agent, or Firm—Fitzpatrick, Cella, Harper & Scinto

[57] ABSTRACT

A method and apparatus for detecting pulse signals corresponding to marks from a recording medium on which the marks are periodically recorded. The recording medium is scanned with a reproducing transducer and a reproduction signal (including the pulse signals) is read out. A gate signal with a predetermined width is generated on the basis of the pulse signal which has been detected at k period before the pulse signal to be detected, where k is an integer more than 1. If the pulse signal before k period is missing, the gate signal with a predetermined width is generated on the basis of the pulse signal which has been detected at k+1 period before. Only the pulse signal existing within the period during which the gate signal is output is extracted from the reproduction signal.

27 Claims, 6 Drawing Sheets

METHOD AND APPARATUS FOR DETECTING PULSE SIGNAL FOR GENERATING CLOCK FROM RECORDING MEDIUM This application is a continuation of application Ser. No. 08/075,342, filed Jun. 11, 1993, now abandoned, which is a continuation of application Ser. No. 07/584,797, filed Sep. 19, 1990, now abandoned.

BACKGROUND OF THE INVENTION

1. Field of the Invention

The present invention relates to a method and device for detecting a pulse signal corresponding to marks from a recording medium on which the marks for generating clock signals are periodically recorded.

2. Related Background Art

Generally, reference pulse signals for generating a clock signal during reproduction are recorded on an information recording medium such as an optical disk or the like.

FIG. 1 is a block diagram showing an example configuration of an optical disk drive apparatus of a sample servo method. In the drawing, the reference numeral 13 is an optical disk used as an information recording medium, numeral 14 is a reproducing transducer, and reference numeral 15 denotes a binarizing circuit.

Signals read from optical disk 13 by reproducing transducer 14 are converted to binary signals by binarizing circuit 15. These binary coded signals are input into a pulse signal extracting circuit 16 and a code decoding circuit 18. From the pulse signal extracting circuit 16 into which binary signals are input, only clock generating reference pulse signals are output. Then, synchronous clock signals are output by way of a phase-locked loop (PLL) circuit 17 and a code decoding circuit 18. On the other hand, reproducing data signals are output from code decoding circuit 18 which also receives the binary signals.

FIG. 2 is a waveform diagram showing signals reproduced from a recording format of a general sample servo method. As indicated in this diagram, signals are composed of servo, address and data portions. "Pc" shown in the diagram represents a reference pulse signal for generating a clock signal and these signals appear at constant intervals "S". The pulse interval d from the pulse before the reference pulse signal Pc for generating clock signals to the point of the reference pulse signal Pc for generating synchronous clock is also constant. Further, this pulse interval is set for a specific interval to prevent the appearance of pulses at other positions. There may be cases when this pulse interval "d" is not made constant. Even in such cases, however, a provided pattern recognition function enables identification of the reference pulse signals Pc for generating the clock signal.

Illustrated in FIG. 3 is an example of a simplified pulse signal extracting circuit for the case of a constant pulse interval "d". FIG. 4 is a time chart showing operation of this extracting circuit.

With reference to FIG. 3, reference numeral 19 represents a retriggerable monostable multivibrator, reference numeral 20 represents a monostable multi-vibrator, and reference numeral 21 represents an AND circuit. When binary signal J is input into retriggerable monostable multivibrator 19, monostable multivibrator 20 outputs a gate signal with a predetermined delay as shown in I in FIG. 4. By inputting the gate signal I and binary signal J into the AND circuit 21, the pulse signal Pc is output from AND circuit 21 as indicated by K in FIG. 4, provided that such a pulse signal Pc exists while the signal I is at a high level. On the other hand, a pulse signal which appears on binary signal J during the period that the gate signal is not output (the period when the signal I is at a low level) is not output from the AND circuit 21. In this manner, only a reference pulse signal for generating a clock signal can be extracted from other signals.

However, when the recording medium involves any defects or dust or foreign particles accumulated on the medium, the pulse signal extracting circuits may fail to output clock generating reference pulse signals. In such a case, there would be no reference for generating the gate signal. To solve this problem, a method for instance, of using other circuits (not shown in the figures) may be employed to generate a pseudo-pulse signal for input into the PLL circuit. A gate signal can be generated by using these pseudo-pulse signals as the reference to extract the pulse signal after missing a reference signal. On the other hand, if output timing of pseudo-signals may extensively deviate from the timing of the pulse signals to be actually detected, a deviation develops between the gate signal subsequent to a missing reference pulse and pulse signals read from the recording medium, resulting in a problem of continuous failure to detect pulse signals.

SUMMARY OF THE INVENTION

Objectives of the present invention lie in solving the above-mentioned problem and offering a method and device to enable accurate extraction of pulse signals even after output failure of pulse signals.

These objectives of the present invention can be achieved by the following method for detecting pulse signals corresponding to marks from the recording medium on which the marks for generating clock signals are periodically recorded, including the steps of scanning a recording medium with a reproducing transducer and reading reproduction signals including the pulse signals, and generating a gate signal with a predetermined pulse width on the basis of the pulse signal detected before a period "k" of the pulse signal to be detected, where the value of "k" is an integer more than 1.

The method further comprises generating a gate signal with a predetermined width on the basis of the pulse signal before period "k+1" when the pulse signal before said period "k" is missing, and extracting only a pulse signal existing within the period during which a gate signal is output from said reproduction signals.

Further, an apparatus for realizing the above-mentioned method, includes a reproducing transducer for reading reproduction signals including the pulse signals from the recording medium by scanning said medium, and "n" gate signal generating circuits, wherein the "k"-th circuit among said circuits generates gate signals with a predetermined width based on pulse signals detected before period "k" of the pulse signal to be detected, where "n" is an integer more than 2, and k=1, ..., n.

The apparatus also includes a selection circuit for selectively outputting gate signals generated by the lowest-order circuit among said gate signal generating circuit when a pulse signal to function as the basis of gate signal generation is not missing, an extraction circuit for extracting from said reproduction signals only the pulse signal existing within the period during which the gate signal is output from the selection circuit, and a clock signal generating circuit for generating a clock signal based on said extracted pulse signal.

DESCRIPTION OF THE PREFERRED EMBODIMENTS

Figure 1:
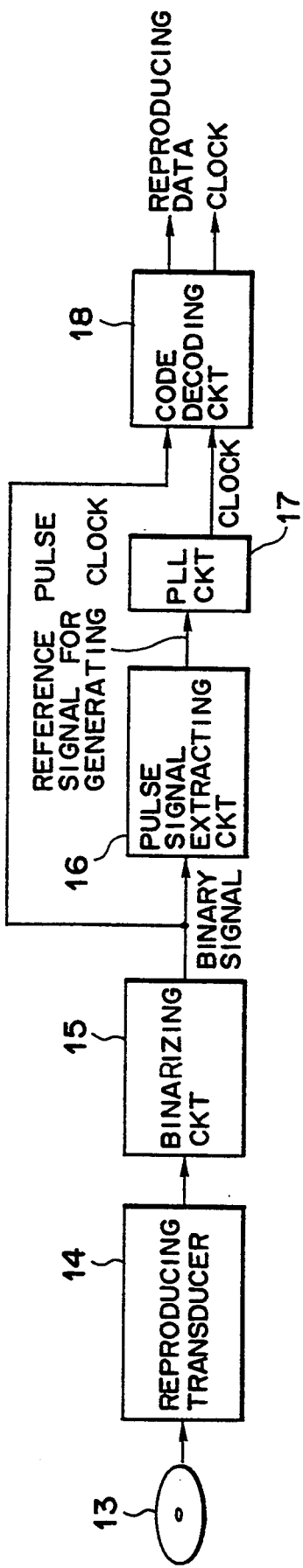
FIG. 1 is a block diagram showing a configuration example of a signal detection device.
Figure 2:
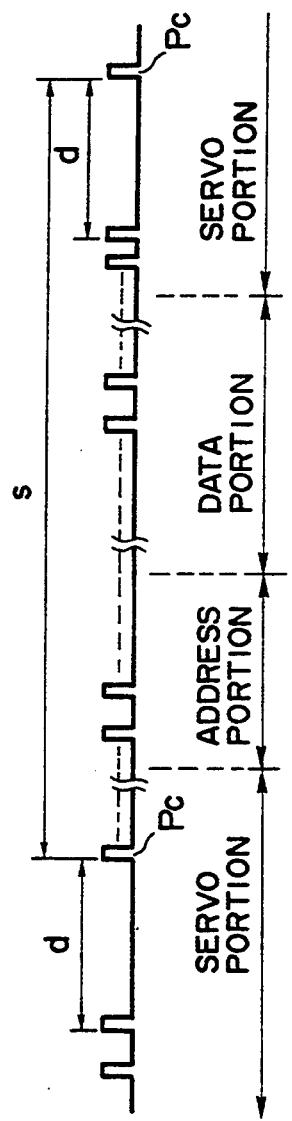
FIG. 2 is a signal waveform diagram read from an optical disk of a sample servo method.
Figure 5:
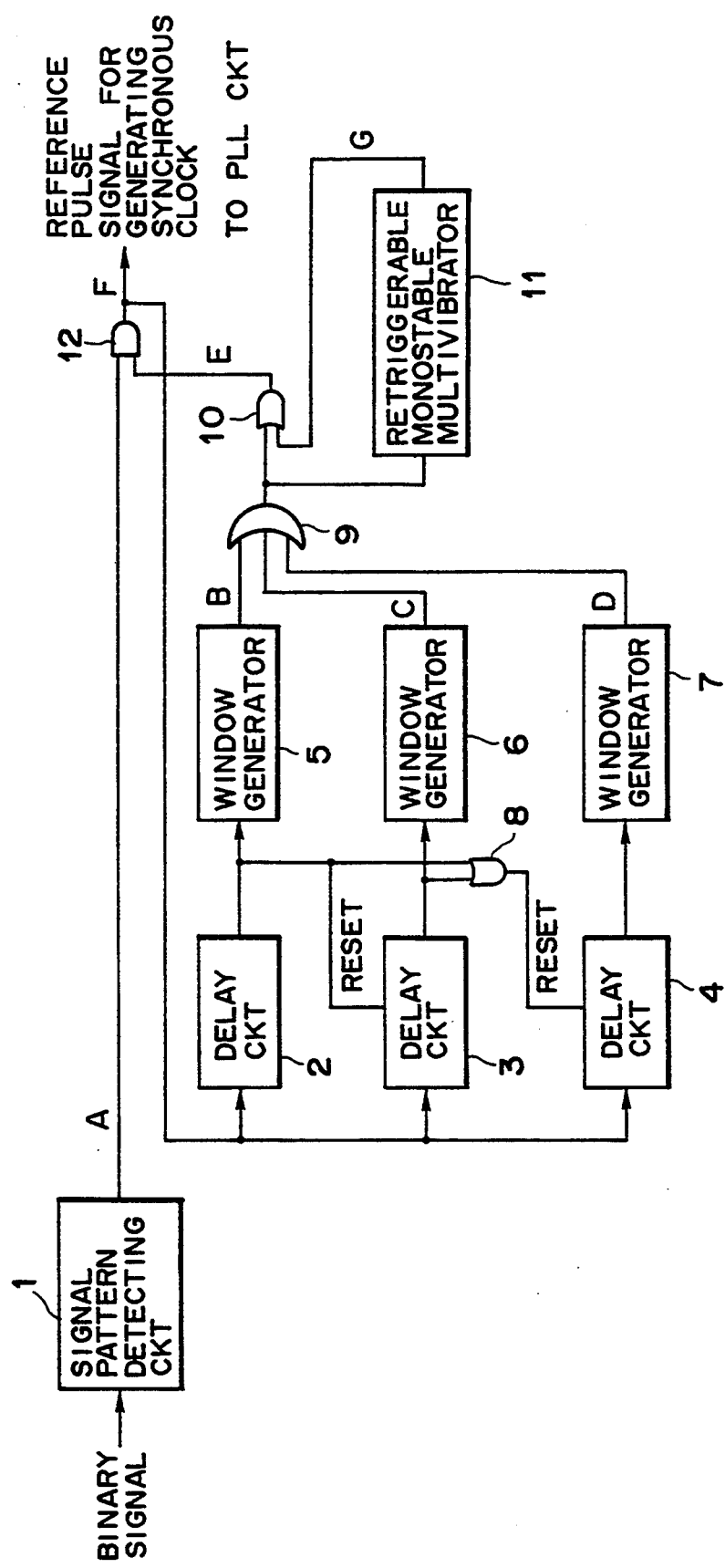
FIG. 5 is a block diagram showing an application example of a pulse signal extracting circuit employed on a signal detection apparatus according to the present invention.

FIG. 5 is a block diagram showing an application example of a pulse signal extracting circuit employed for the signal detection apparatus according to the present invention. Also, FIG. 6 through FIG. 9 are timing charts indicating the signal waveform at respective sections shown in FIG. 5. The signal detecting circuit according to the present invention adopts the same construction as that of, for example, the device shown in FIG. 1, except that the circuit in FIG. 5 is used as the pulse signal extracting circuit.

Figure 3:
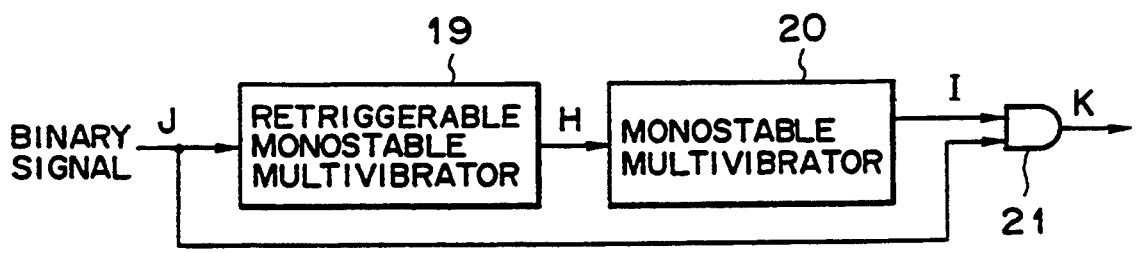
FIG. 3 is a block diagram showing a configuration example of a pulse signal extracting circuit of a conventional signal detection device.
Figure 4:
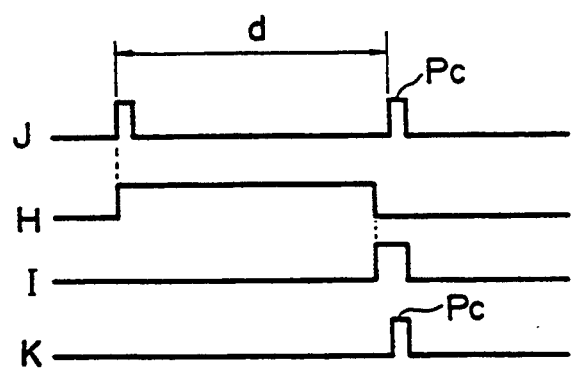
FIG. 4 is a signal waveform diagram of each portion of the circuit shown in FIG. 3.

In regard to FIG. 5, the reference numeral 1 is a signal pattern detecting circuit, for which the same circuit configuration, for instance, as that in FIG. 3 can be employed. To this signal pattern detecting circuit 1, a binary signal is input from a reproducing transducer (not shown in FIG. 5) and from this circuit, the binary signal is output as signal A. Numeral 12 is an AND circuit into which binary signal A is input and the output from this AND circuit 12 goes into delay circuits 2, 3, and 4. The delay circuit 3 is reset by the output of the delay circuit 2 while the delay circuit 4 is reset by the output from an OR circuit 8 connected with the outputs of the delay circuit 2 and the delay circuit 3. The output from each of delay circuits 2, 3, and 4 is respectively input into window generators 5, 6, and 7 of which the respective outputs B, C and D are input into an OR circuit 9. Then, the output from this OR circuit 9 is input into an OR circuit 10 and retriggerable monostable multivibrator 11. The output G from this retriggerable monostable vibrator 11 is also input into the OR circuit 10. The OR circuit 10 next sends its output E into the AND circuit 12, from which the output F comprising only a synchronous clock generating reference pulse signal is output.

Further, since signal A output from the signal pattern detecting circuit 1 is a special pattern so as not to appear in other intervals, it should comprise a regular pulse with constant period if no error is involved in the input binary signal. On the other hand, should any error occur on the input binary signal, erroneously detected pulses are observed or synchronous clock generating reference pulse signals are missed. The problem of this type can be eliminated by employing the pulse signal extracting circuit shown in FIG. 5.

Explained hereinafter is the operation of the above-mentioned pulse signal extracting circuit by referring to FIG. 5 through FIG. 9.

Figure 6:
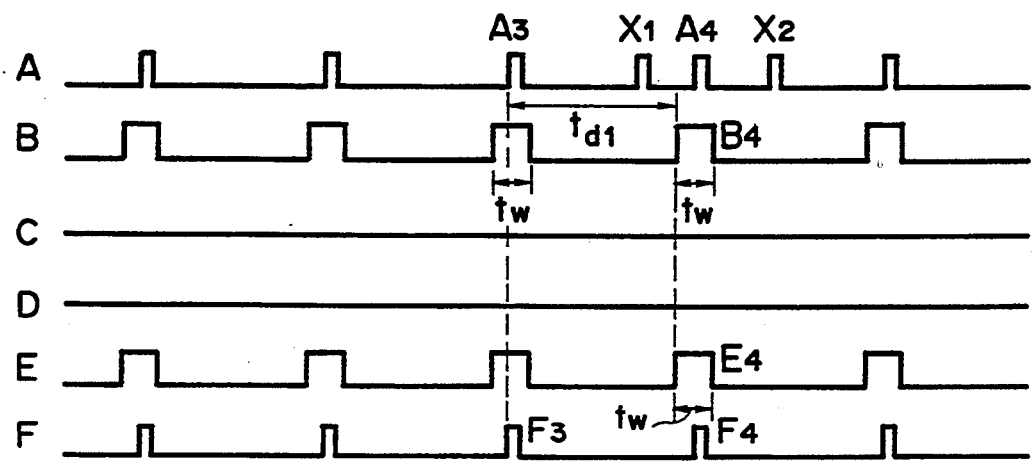
FIGS. 6 through 9 are signal waveform diagrams for sections of the circuit shown in FIG. 5.
Figure 7:
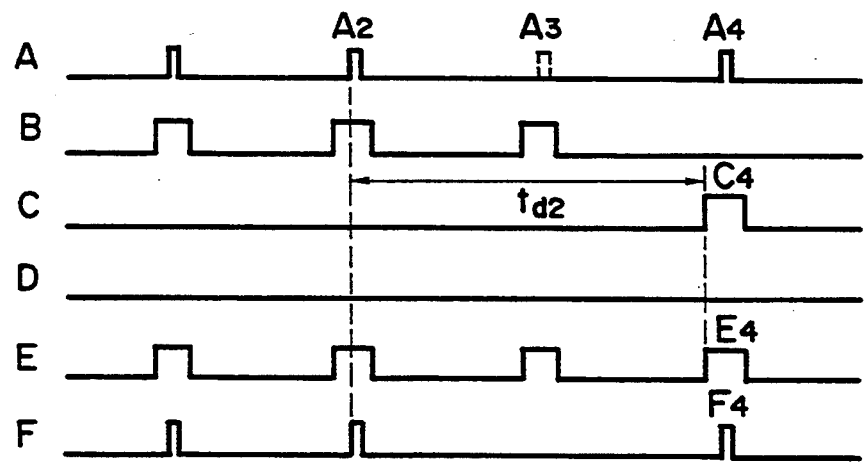
Figure 8:
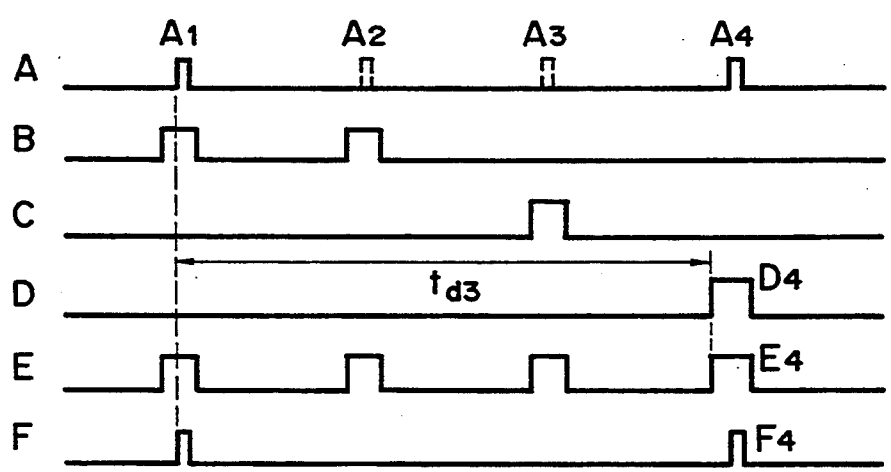
Figure 9:
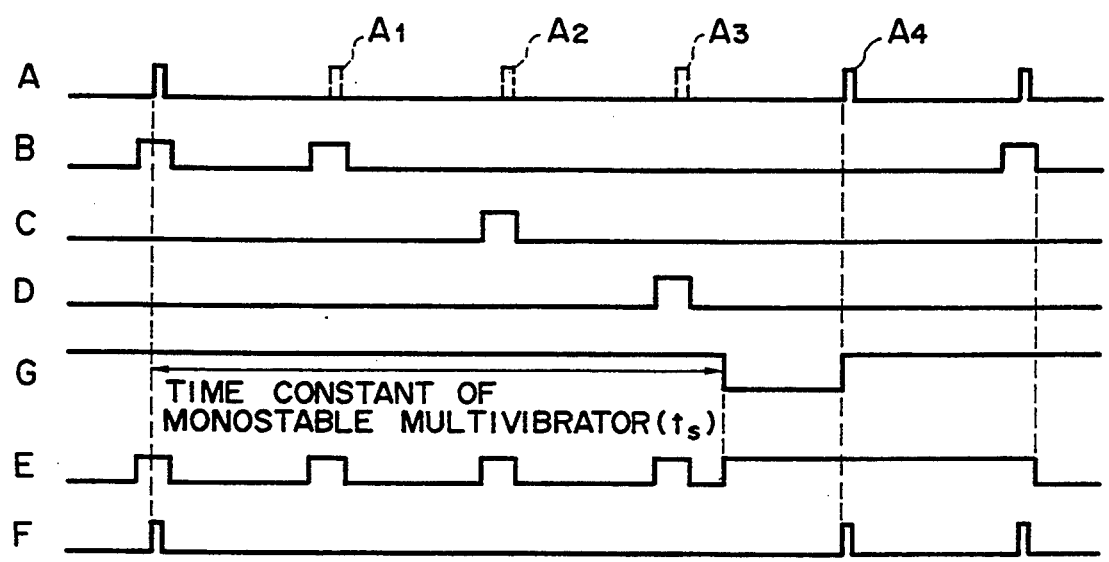

Shown in FIG. 6 is the operation of the circuit when error detecting pulses $X_1$ and $X_2$ occur, shown in FIG. 7 is the operation of the circuit when a pulse signal $A_3$ which is to become one of reference pulse signals for generating clock signals is missed, and shown in FIG. 8 is the operation of the circuit when continuous pulse signals $A_2$ and $A_3$ are missed. Further, FIG. 9 is the timing chart intended to explain the circuit operation when the signal missing fault is caused by missing continuous pulse signals of $A_1$, and $A_2$, and $A_3$.

As is evident from FIG. 5 and FIG. 6, the pulse signal $A_3$ corresponding to reference pulse signal F for generating a clock signal is caused to be input into the window generator 5 after being delayed for a constant period of time $t_{d1}$ by delay circuit 2. Then, from this window generator 5, gate signal $B_2$ with the width of $t_w$ is output and gate signal $E_4$ is input into the AND circuit 12 via the OR circuits 9 and 10. When pulse signal $A_4$ is output from the AND circuit 12 during output of the gate signal $E_4$, namely, while the gate signal E assumes a high level, the pulse signal $A_4$ is output from the AND circuit 12 in the form of reference pulse signal $F_4$ for generating the clock signal.

Wherein, the time period $t_{d1}$ and the gate width $t_w$ are set so that "$t_{d1} < t_c$" and "$t_{d1} + t_w > t_c + t_p$" are satisfied when $t_c$ is the period of the synchronous clock pulse and $t_p$ is the pulse width of the synchronous clock pulse. As is shown in FIG. 6, when the occurrence of erroneously detected pulses $X_1$ and $X_2$ before and after pulse signal $A_4$ is considered, output E from the OR circuit 10 is at a low level while these erroneously detected pulses are at a high level. In other words, because erroneously detected pulses $X_1$ and $X_2$ do not exist within the window (the signal output period of gate width $t_w$), these erroneously detected pulses are not output from the AND circuit 12. Instead, only pulse signal $F_4$ is sent to the PLL circuit.

As shown in FIG. 7, if pulse signal $A_3$ at the point of one period before pulse signal $F_4$ to be detected is missing, delay circuit 3 in FIG. 5 is not reset. Therefore, pulse signal $A_2$ at the point of two periods before is delayed by delay circuit 3 for the time length of $t_{d2}$ and then is input into the window generator 6. From this window generator 6, gate signal $C_4$ passes through the OR circuits 9 and 10 and becomes gate signal $E_4$ and is input in the AND circuit 12.

If the pulse signal $A_4$ is input into the AND circuit 12 while the gate signal $E_4$ is being output (during the signal E assuming high-level), the signal $A_4$ is output from the AND circuit 12 as a reference pulse signal $F_4$ for generating a clock signal. The time $t_{d2}$ and the gate width $t_w$ are set so that "$t_{d2} < 2t_c$" and "$t_{d2} + t_w > 2t_c + t_p$" are satisfied.

FIG. 8 reveals the case of continuous missing pulse signals $A_3$ and $A_2$ at the points respectively one and two periods before pulse signals $F_4$ to be detected. In such a case, the delay circuit in FIG. 5 is not reset. Consequently, the pulse signal $A_1$ before three periods is delayed by the delay circuit 4 for the time $t_{d3}$ and is input into the window generator 7. Subsequently, this window generator 7 sends out gate signal $D_4$ with gate width $t_w$. The gate signal $D_4$ passes through the OR circuits 9 and 10, becomes gate signal $E_4$, and enters into the AND circuit 12. When the pulse signal $A_4$ is input into the AND circuit 12 while the gate signal $E_4$ is being output (during the signal E assuming high-level), the signal $A_4$ is output from the AND circuit 12 as reference pulse signal $F_4$ for generating a clock signal.

As explained above, even in the case of missing one or two pulses that serve as the basis of gate signal generation, the subject invention technique allows correct extraction of pulse signals by generating a gate signal on the basis that pulse signals at two or three periods before the pulse signal to be detected are used as the reference.

Shown in FIG. 9 is the case when detection of three continuous pulse signals of $A_1$, $A_2$, and $A_3$ are missed. In such a case, the retriggerable monostable multivibrator 11 shown in FIG. 5 is actuated to temporarily release gate signal E. Namely, extraction of pulse signals by a gate signal is suspended and signal A is caused to enter as such into the PLL circuit. After this gate release, when first pulse signal $A_4$ is detected, normal operation, that is, pulse signal extraction by the gate signal, is subsequently resumed.

Time constant $t_s$ of the retriggerable monostable multivibrator is set so that $4t_c > t_s > 3t_c + t_p$ is satisfied. On the above-mentioned application example, a counter may be used for the delay circuit, the window generator, and the retriggerable monostable multivibrator. For the same purpose, use of a multivibrator is also acceptable.

Figure 10:
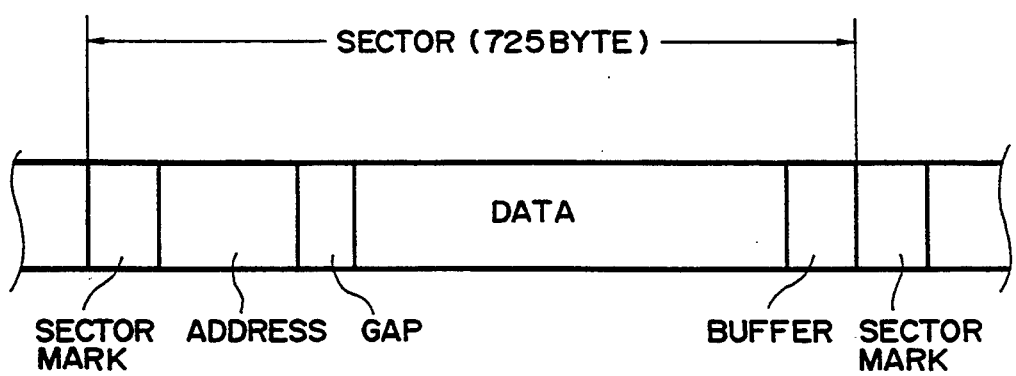
FIG. 10 is a diagram showing a sector configuration example on a recording medium having information tracks divided into plural sectors.

While explanations have been made as above on signal detection from an optical disk of a sample servo method, the present invention can be applied to an apparatus employing other types of recording media. For instance, on an optical disk of a continuous servo method, tracks formed in spiral configuration or concentric circles are further divided into plural sectors in a circumferential direction. Each sector is constructed, for example as shown in FIG. 10. One sector possesses the capacity of 725 bytes and at its front end, a sector mark is preformatted. Sequentially arranged behind this sector mark are preformatted address signals, a gap, data portion, and a buffer. Therefore, the sector marks periodically exist after every 725 bytes. When recording information into or reproducing information from a data portion of such a disk, a clock signal is generated from the sector marks. To extract the pulse signals corresponding to the sector marks, a signal extracting circuit similar to the one in FIG. 5 is used. In other words, signal pattern detecting circuit 1 shown in FIG. 5 functions as the sector mark detecting circuit.

The subject invention can also be applied to an apparatus which employs a medium inserted with resynchronizing signals after every constant amount of data. In such an application, the resynchronizing signal is extracted from a circuit with a configuration similar to that of FIG. 5, and signal pattern detecting circuit 1 in FIG. 5 functions as a resynchronizing signal detecting circuit.

It is possible to use the present invention in various other applications besides the examples explained above. For instance, the present invention can be applied to an apparatus not only for an optical disk but also to a device employing an optical recording medium of another type or a magnetic recording medium such as a magnetic disk. Further, use of the pulse signal extracting circuit explained in the above examples is not limited to a device for detecting a signal from a recording medium. In other words, this circuit may also be applied to a device in which the pulse signal to be periodically be output should be separated from other signals and be detected. As long as the scope of the claim is not deviated from the spirit of the present invention, the subject invention is inclusively usable for all such wide-variety of purposes.

What is claimed is:

1. An apparatus for detecting periodical pulse signals corresponding to marks from a recording medium in which the marks for generating a clock signal are periodically recorded, comprising:

a reproducing transducer for reading a reproduction signal including a plurality of said pulse signals from the recording medium by scanning said medium;

first through n-th gate signal generating circuits, each of which generates a gate signal with a predetermined width from respective first through n-th consecutive pulse signals from among the plurality of pulse signals, where n is an integer of 2 or more;

a selection circuit for selectively outputting the gate signal which is generated by the lowest-order circuit among said n gate signal generating circuits when none of the n pulse signals to function as the bases of gate signal generation are missing;

an extracting circuit for extracting from said reproduction signal only pulse signals existing within the period during which the gate signal is being output from the selection circuit; and a clock signal generating circuit for generating a clock signal based on said extracted pulse signal.

2. An apparatus according to claim 1, further comprising a gate release circuit for suspending extraction by the gate signal and inputting the reproduction signal directly into the clock signal generating circuit when the pulse signals for all of said "n" number of gate signal generating circuits are missing.

3. An apparatus according to claim 2, wherein said gate release circuit restarts extraction by the gate signal when a pulse signal is detected from the reproduction signal not subjected to extraction by the gate signal.

4. An apparatus according to claim 3, wherein said gate release circuit comprises a retriggerable monostable multivibrator into which the output from the selection circuit is input and an OR gate which outputs a logical sum signal of the outputs of said multivibrator and selection circuit to the signal extracting circuit.

5. An apparatus according to claim 1, wherein each of said gate signal generating circuits comprises a delay circuit for causing the detection pulse signal to be delayed by time $t_d$ and a window generator for generating a gate signal with the width $t_w$ from the output of the delay circuit, and wherein the following condition is satisfied:

$$t_d < k \cdot t_c \text{ and}$$

$$t_d + t_w > k \cdot t_c + t_p.$$

when $t_c$ is a period of a pulse signal, $t_p$ is a width of the pulse signal and k is an integer from 1 to n.

6. An apparatus according to claim 5, wherein said selection circuit comprises a first OR gate for outputting a logical sum signal of the outputs of the "n" number of gate signal generating circuits to the signal extraction circuit and a second OR gate for resetting the delay circuit for each respective gate signal generating circuit using the logical sum signal of the outputs of the delay circuits in all gate signal generating circuits of a lower order than the respective delay circuit.

7. An apparatus according to claim 1, wherein said extraction circuit comprises an AND gate which outputs a logical multiplication signal of the output from the selection circuit and the reproduction signal to the clock signal generating circuit.

8. An apparatus according to claim 1, further comprising a binarizing circuit which binarizes the output of said reproducing transducer to be input into the extracting circuit.

9. An apparatus according to claim 1, further comprising a decoding circuit which decodes data from the reproduction signal by using the clock signal generated by said clock signal generating circuit.

10. An apparatus according to claim 1, wherein marks are recorded on said recording medium according to the format of sample servo method.

11. An apparatus according to claim 1, wherein said recording medium possesses tracks divided into plural sectors and said marks comprise sector marks positioned at the head of each sector.

12. An apparatus according to claim 1, wherein said marks comprise resynchronizing signals recorded on the recording medium after every predetermined amount of data.

13. A detecting method for detecting periodical pulse signals corresponding to marks from a recording medium on which the marks for generating clock signals are periodically recorded, comprising the steps of:
   scanning said recording medium with a reproducing transducer and reading reproduction signals including said pulse signals;
   generating a gate signal with a predetermined width based on one of the pulse signals when said one pulse signal is not missing;
   generating a gate signal with a predetermined width based on a pulse occurring one period before said one pulse signal when said one pulse signal is missing; and
   extracting only pulse signals existing within a period during which the gate signal is being output from said reproduction signal.

14. A method according to claim 13 further comprising the step for generating gates signal on the basis of pulse signal in further one period before when the pulse signal in one period before is missing.

15. A detecting method according to claim 14, wherein, when a predetermined number of consecutive pulse signals are missing, said gate signal width is extended and the output of the gate signal is continued until a pulse signal appears in the reproduction signal.

16. A method according to claim 13, wherein the following condition is satisfied:

$t_d < k \cdot t_c$ and $t_d + t_w > k \cdot t_c + t_p$, where $t_w$ is a width of the gate signal, $t_d$ is the time to rise the gate signal from the pulse signal functioning as the base of the gate signal generation, $t_c$ is a period of the pulse signal, $t_p$ is a width of the pulse signal and k is one of the integers of 1 or more.

17. An apparatus for extracting pulse signals from a time series signal including pulse signals to be output with a constant period, comprising:
   first through n-th gate signal generating circuits, each of which generates a gate signal with a predetermined width from respective first through n-th consecutive pulse signals from among the plurality of pulse signals, where n is an integer of 2 or more;
   a selection circuit for selectively outputting the gate signal generated by the lowest-order circuit among the gate signal generating circuits when none of the n pulse signals to function as the bases of gate signal generation are missing; and
   an extracting circuit for extracting from said time series signal only pulse signals existing within the period during which the gate signal is being output from said selection circuit.

18. An apparatus according to claim 17, further comprising a gate release circuit for suspending the extraction by the gate signal and causing the time series signal to be output as it is when the pulse signals for all of said "n" number of gate signal generating circuits are missing.

19. An apparatus according to claim 18, wherein said gate release circuit restarts the extraction by the gate signal when a pulse signal is output from the time series signal not subjected to extraction by the gate signal.

20. An apparatus according to claim 19, wherein said gate release circuit comprises a retriggerable monostable multivibrator into which the output from the selection circuit is input and an OR gate which outputs logical sum signal of the outputs of said vibrator and said selection circuit to the extracting circuit.

21. An apparatus according to claim 17, wherein said extracting circuit comprises an AND gate which outputs logical multiplication signal of the output of the selection circuit and the time series signal.

22. An apparatus according to claim 17, wherein each of said gate signal generating circuits comprises a delay circuit for causing the detection pulse signal to be delayed by time $t_d$ and a window generator for generating a gate signal with the width $t_w$ from the output of the delay circuit, and wherein the following condition is satisfied:

$t_d < k \cdot t_c$, and $t_d + t_w > k \cdot t_c + t_p$ where $t_c$ is a period of the pulse signal, $t_p$ is a width of the pulse signal and k is one of the integers from 1 to n.

23. An apparatus according to claim 22, wherein said selection circuit comprises a first OR gate for outputting logical sum signal of the outputs of "n" number of gate signal generating circuits to the extracting circuit and a second OR gate for resetting the delay circuit in the respective gate signal generating circuit by logical sum signal of the outputs of the delay circuits in all gate signal generating circuits possessing lower order than the delay circuit.

24. An extraction method for extracting a pulse signal from a time series signal including pulse signals which are output at a constant period, comprising the steps of:
   generating a gate signal with a predetermined width based on one of the pulse signals when said one pulse signal is not missing;
   generating a gate signal with a predetermined width based on the pulse signal occurring one period before said one pulse signal when said one pulse signal is missing; and extracting from said time series signal only the pulse signals existing during a period when the gate signal is being generated.

25. A method according to claim 24 further comprising the step for generating the gate signal on the basis of a pulse signal in a further one period before when the pulse signal in the one period before is missing.

26. A method according to claim 24, wherein the following condition is satisfied:

$$t_d > k \cdot t_c, \text{ and}$$

$$t_d + t_w > k \cdot t_c + t_p$$

where $t_w$ is a width of the gate signal, $t_d$ is the time to rise the gate signal from the pulse signal functioning as the base of the gate signal generation, $t_c$ is a period of the pulse signal, $t_p$ is a width of the pulse signal and k is one of the integers of 1 or more.

27. An extraction method according to claim 25, wherein, when a predetermined number of consecutive pulse signals are missing, the gate signal width is extended and the output of the gate signal is continued until a pulse signal appears in the time series signal.

* * * * *

UNITED STATES PATENT AND TRADEMARK OFFICE
CERTIFICATE OF CORRECTION

PATENT NO. : 5,436,881
DATED : July 25, 1995
INVENTOR(S) : SEIICHIRO SATOMURA

It is certified that error appears in the above-indentified patent and that said Letters Patent is hereby corrected as shown below:

COLUMN 3

Line 10, "method," should read --method.--.

COLUMN 4

Line 51, "$E_4$." should read --$E_4$ --.

COLUMN 6

Line 2, "be" (first occurrence) should be deleted.

UNITED STATES PATENT AND TRADEMARK OFFICE
CERTIFICATE OF CORRECTION

PATENT NO. : 5,436,881

DATED : July 25, 1995

INVENTOR(S) : SEIICHIRO SATOMURA

It is certified that error appears in the above-indentified patent and that said Letters Patent is hereby corrected as shown below:

<u>COLUMN 7</u>

Line 44, "claim 13" should read --claim 13,--.
    Line 45, "gates" should read --a gate--.

Signed and Sealed this

Twelfth Day of December, 1995

Attest:

BRUCE LEHMAN

*Attesting Officer*    *Commissioner of Patents and Trademarks*